United States Patent [19]

Harvey

[11] Patent Number: 4,855,773
[45] Date of Patent: Aug. 8, 1989

[54] MOTOR-DRIVEN FILM TRANSPORT APPARATUS

[75] Inventor: Donald M. Harvey, Webster, N.Y.

[73] Assignee: Eastman Kodak Company, Rochester, N.Y.

[21] Appl. No.: 221,955

[22] Filed: Jul. 20, 1988

[51] Int. Cl.⁴ .................................................. G03B 1/12
[52] U.S. Cl. ........................................................ 354/173.1
[58] Field of Search ........................................... 354/173.1

[56] References Cited

U.S. PATENT DOCUMENTS

| | | | |
|---|---|---|---|
| Re. 32,558 | 12/1987 | Chan | 354/173.1 |
| 41,574 | 2/1864 | Groel | 192/43.1 |
| 2,778,467 | 1/1957 | Lewis | 192/50 |
| 2,784,820 | 3/1957 | Clark | 192/43 |
| 3,463,280 | 8/1969 | Hoffman et al. | 192/43.1 |
| 4,423,943 | 1/1984 | Gold | 354/275 |
| 4,497,555 | 2/1985 | Akiyama | 354/173.1 |

Primary Examiner—Michael L. Gellner
Attorney, Agent, or Firm—Roger A. Fields

[57] ABSTRACT

A photographic camera is intended for use with a film cassette, wherein rotation of a cassette film spool in an unwinding direction thrusts a film leader from the cassette interior to a film take-up drum of the camera and rotation of the spool in a rewinding direction draws the leader back into the cassette interior. The film transport apparatus of the camera includes a bi-directional drive member having respective positions for effecting alternate one-way driving connections with the cassette spool to rotate the spool in the unwinding and rewinding directions in accordance with the rotational direction of a single bi-directional drive motor. During advance of the film leader from the film cassette to the take-up drum, the drum is motor-driven at a faster speed than the cassette spool is rotated. When the film leader is secured to the take-up drum, the drive member permits the cassette spool to be overdriven by the resulting pull of the filmstrip exerted at the spool. During rewinding of the filmstrip onto the cassette spool, the take-up drum is uncoupled from the drive motor to allow the cassette spool to serve as the only means for film movement.

8 Claims, 6 Drawing Sheets

MOTOR-DRIVEN FILM TRANSPORT APPARATUS

CROSS-REFERENCE TO A RELATED APPLICATION

Reference is made to commonly assigned copending application Ser. No. 193,323, entitled Film Cassette, and filed May 12, 1988 in the name of Jeffrey C. Robertson.

BACKGROUND OF THE INVENTION

1. Field of the Invention

The invention relates generally to photography, and particularly to a motor-driven film transport apparatus for a photographic camera.

2. Description of the Prior Art

Generally speaking, commercially available 35 mm film cassettes comprise a hollow cylindrical shell having an integral throat or lipped portion which extends tangentially from the shell. A film spool on which the filmstrip is wound is freely rotatable within the cassette shell. The filmstrip has a leading end section, commonly referred to as a "film leader", which protrudes from a light-trapped slit in the throat portion to the outside of the cassette shell. Typically, the protruding leader is 2–3 inches in length.

Commonly assigned U.S. Pat. No. Reissue 32,558, granted Dec. 15, 1987, discloses an auto-threading camera to be used with a conventional 35 mm film cassette, wherein a single drive motor via suitable gearing rotates a take-up drum at a faster speed than it rotates a metering sprocket. Initially, the sprocket is rotated by the motor to thread the film leader to the faster-moving drum. Once the film leader is secured to the drum, a unidirectional ratchet clutch for rotating the sprocket allows the sprocket to be overdriven by the filmstrip, whereupon the sprocket serves its normal function of acting as a film-driven frame sensor. During rewind of the filmstrip back into the cassette shell after exposure is completed, the clutch disconnects the sprocket from the motor, allowing the sprocket to continue to be film-driven In addition, the film spool within the cassette shell is rotated by the motor to rewind the filmstrip onto the spool, and the drum is rotated by the motor at a faster speed to facilitate disengagement of the filmstrip from the drum.

In conventional 35 mm film cassettes, one end of the film spool on which the filmstrip is wound has a short axial extension which projects from the cassette shell, enabling the spool to be turned by hand. If the spool is initially rotated in an unwinding direction, the film convolutions inside the cassette shell will tend to expand radially since the inner end of the filmstrip is attached to the spool, and the film leader protruding from the slit will remain stationary. The film convolutions can expand radially until a non-slipping relation is established between the outermost convolution and the inner curved wall of the cassette shell. Once this non-slipped relation exists, there is a binding effect between the outermost convolution and the shell which prevents further rotation of the spool in unwinding direction. Thus, rotation of the spool in the unwinding direction cannot serve to advance the filmstrip out of the shell, and it is necessary in the typical 35 mm camera to engage the protruding leader as in U.S. Pat. No. Reissue 32,558 to draw the filmstrip out of the shell.

A 35 mm film cassette has been proposed which, unlike conventional film cassettes, includes a film leader that does not extend outside the cassette shell. The film leader, instead, is located entirely within the cassette shell. Specifically, in U.S. Pat. No. 4,423,943, granted Jan. 3, 1984, there is disclosed a film cassette wherein the outermost convolution of the film roll round on the film spool is radially constrained by respective circumferential lips of two axially spaced flanges of the spool to prevent the outermost convolution from contacting an inner wall of the cassette shell. The trailing end of the filmstrip is secured to the film spool, and the leading end of the filmstrip is reduced in width to allow it to protrude from between the circumferential lips and rest against the shell wall. During unwinding rotation of the film spool, the leading end of the filmstrip is advanced to and through a film passageway opening in order to exit the cassette shell. The opening has a width which is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette appears to be intended to be loaded in a camera only after the film leader is advanced to protrude from the cassette shell. In the patent, it is suggested that one manually rotate the film spool relative to the cassette shell until the leader can be manually grasped and attached to a film advancing device in a camera.

THE CROSS-REFERENCED APPLICATION

Like the type of film cassette disclosed in U.S. Pat. No. 4,423,923, the cross-referenced application discloses a film cassette that contains a non-protruding film leader which is automatically advanced to the outside of the cassette shell in response to rotation of the film spool in the unwinding direction.

SUMMARY OF THE INVENTION

According to the invention, there has been devised an improved motor-driven film transport apparatus for a photographic camera to be used with a film cassette having a film spool rotatable to unwind a filmstrip off the spool to propel the filmstrip from the cassette and alternatively to rewind the filmstrip onto the spool to draw the filmstrip back into the cassette, wherein a take-up drum is rotatable to take-up the filmstrip and a bi-directional drive motor is rotatable in a first direction to rotate the take-up drum to take up the filmstrip, and wherein the improvement comprises:

motor-to-drum transmission means for coupling said drive motor and said take-up drum, when the motor is rotated in the first direction, to rotate the drum to take up the filmstrip, and for uncoupling the motor and the drum, when the motor is rotated in an opposite direction, to allow the drum to be rotated freely; and motor-to-spool transmission means for coupling the drive motor and the film spool, when the motor is rotated in the first direction, to rotate the spool to propel the filmstrip from the cassette at a lesser speed than the take-up drum can take up the filmstrip, for uncoupling the motor and the spool in response to a film pull being exerted at the spool due to take up of the filmstrip at the drum, and for coupling the motor and the spool, when the motor is rotated in the opposite direction, to rotate the spool to draw the filmstrip back into the cassette.

More specifically, the motor-to-spool transmission means includes a bi-directional drive member having respective positions for effecting alternate one-way driving connections with the film spool to rotate the spool to unwind and rewind the filmstrip in accordance with the rotational direction of the drive motor. During advance of a film leader from the cassette to the take-up drum, the drum is motor-driven at a faster speed than the film spool is rotated. When the film leader is secured to the take-up drum, the drive member permits the film spool to be overdriven by the resulting pull of the filmstrip exerted at the spool. During rewinding of the filmstrip onto the film spool, the take-up drum is uncoupled from the drive motor to allow the spool to serve as the only means for film movement.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment It is to be understood, however, that other elements not specifically shown or described may take various forms known to persons of ordinary skill in the art.

THE FILM CASSETTE

Figure 1:
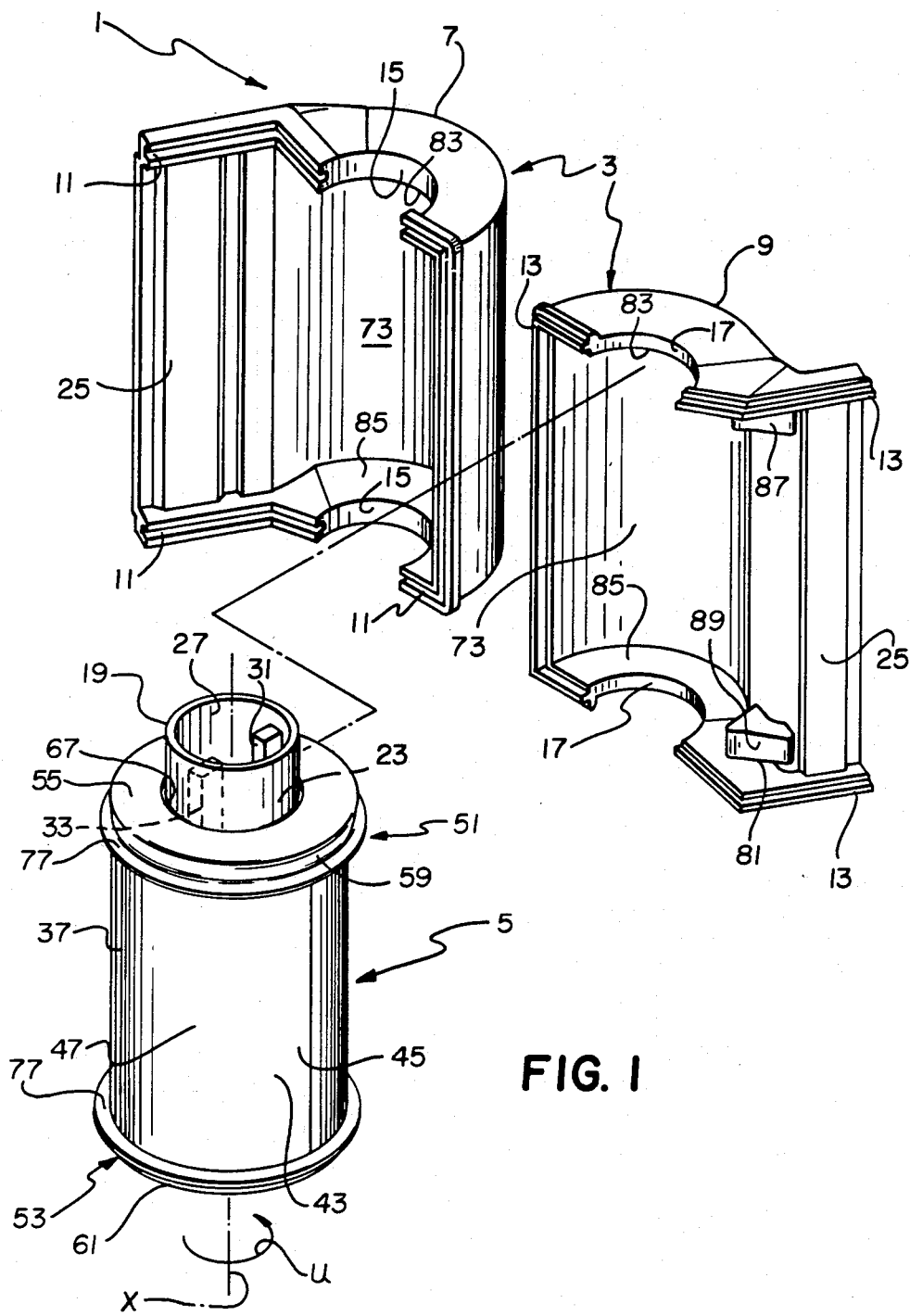
FIG. 1 is an exploded perspective view of a film cassette having a non-protruding film leader as disclosed in the cross-referenced application.
Figure 2:
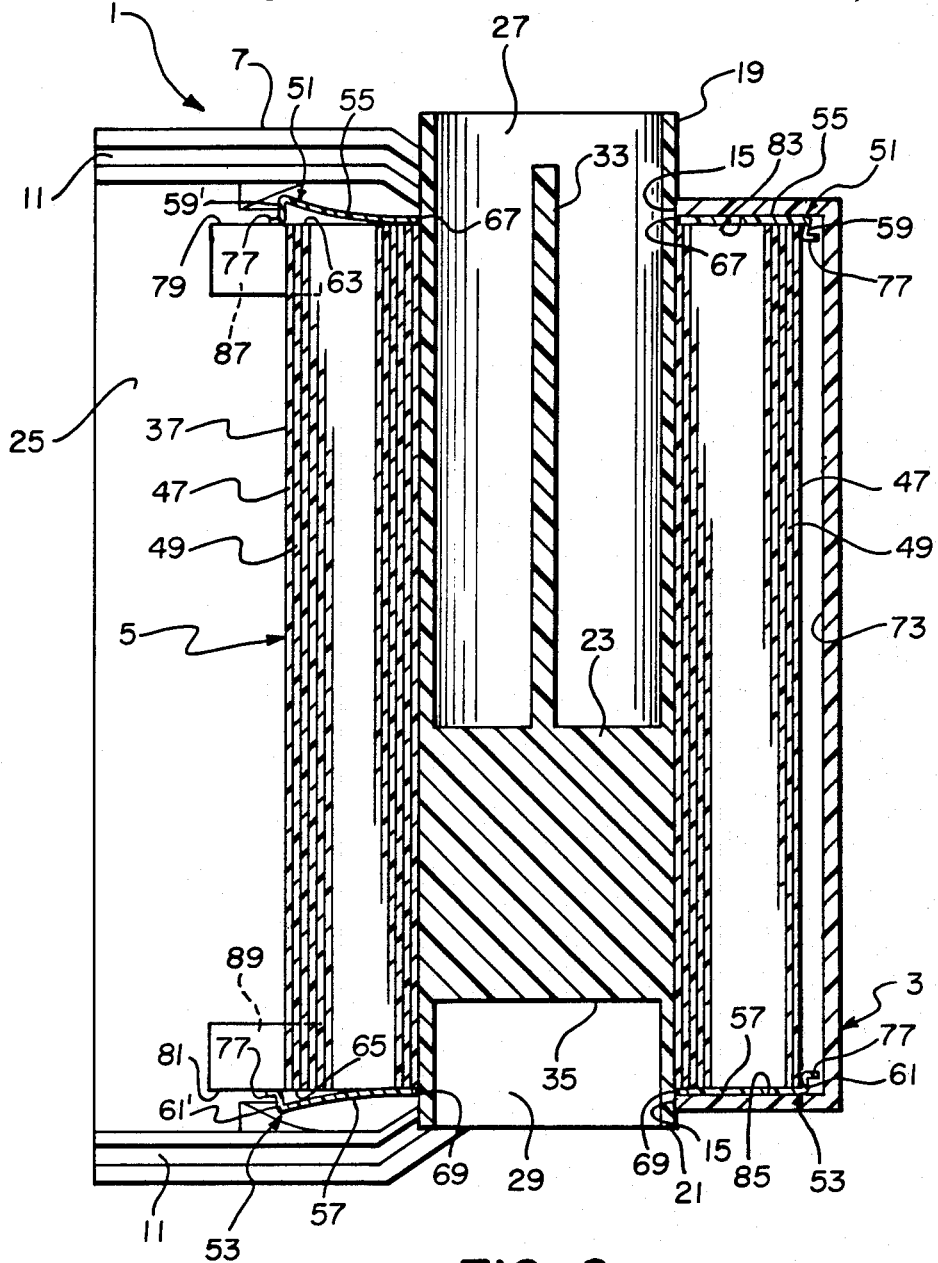
FIG. 2 is an elevation view in cross-section of the film cassette.
Figure 3:
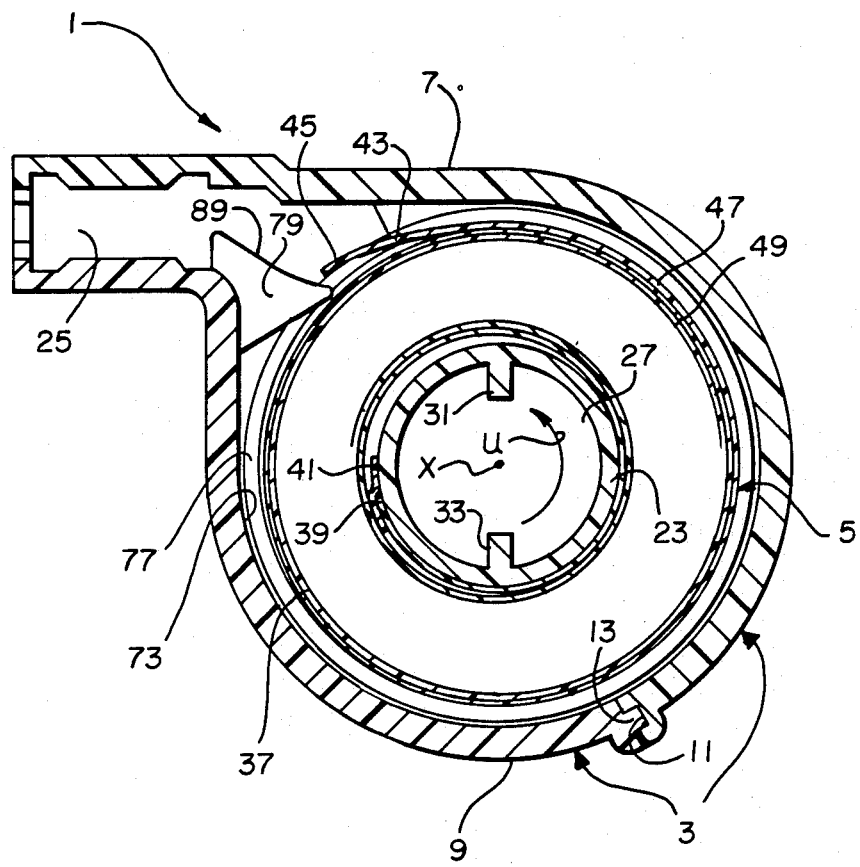
FIG. 3 is an end view in cross-section of the film cassette.

Referring now to the drawings, FIGS. 1-3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33 and 35 according to custom may be engaged to rotate the film spool in an unwinding direction indicated by the arrow U in FIG. 1, or to rotate the spool in a rewinding direction opposite to the unwinding direction.

A roll 37 of convoluted 35 mm film having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has leading or forward end 45 and comprises 2-3 convolutions of the film roll 37. One of these leader convolutions is the outermost convolution 47 and another of them is the next inward succeeding convolution 49.

Figure 4:
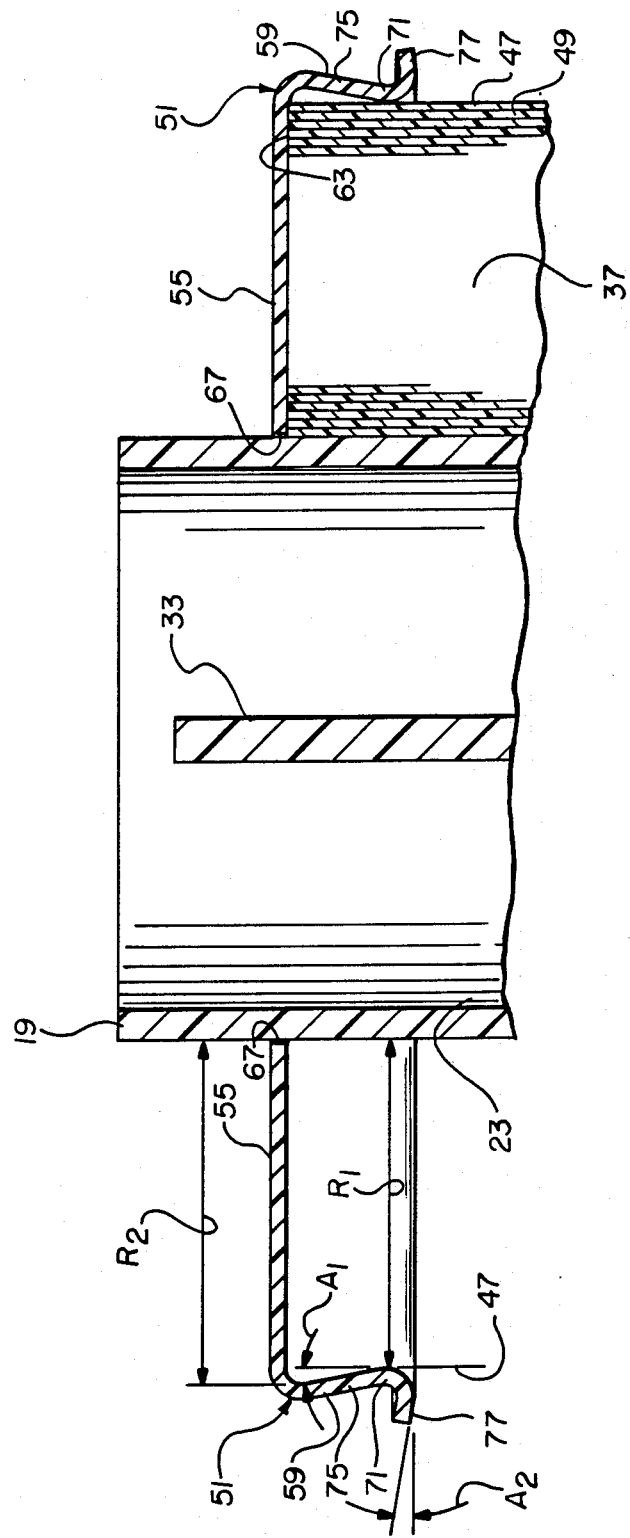
FIG. 4 is an elevation view in cross-section of one of a pair of flanges associated with a film spool located within the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$ l, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47.

The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59' and 61' of the annular lips 59 and 61 axially away from each other to an axial dimension slightly exceeding the film width. See FIG. 2. In essence, the deflected portions 59' and 61' of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Sine the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59' and 61' of the annular lips 59 and 61 axially away from each other as the respective portions are rotated past the spreader surfaces. The deflected portions 59' and 61' of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction opposite to the unwinding direction U, the filmstrip will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

THE PHOTOGRAPHIC CAMERA

Figures 5, 6, 7:
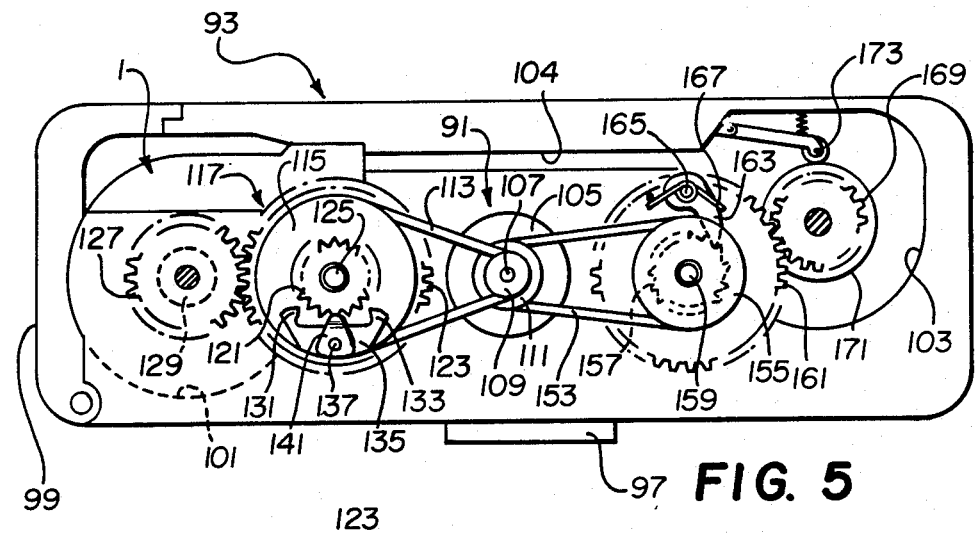
FIG. 5 is a bottom plan view of an improved motor-driven film transport apparatus in a photographic camera to be used with the film cassette depicted in FIGS. 1-4, according to a preferred embodiment of the invention.
FIG. 6 is a bottom plan view of a bi-directional film drive mechanism of the film transport apparatus.
FIG. 7 is a cross-sectional view of the bi-directional film drive mechanism as viewed in the direction of the arrows 7, 7 in FIG. 6.

Referring now to FIGS. 5–7, an improved motor-driven film transport apparatus 91 for a photographic camera 93 is depicted for use with the film cassette 1. The camera body 95 is shown with a front lens shield 97, a side door 99 opening to a cassette-receiving chamber 101, a separate film take-up chamber 103, and a film guide channel 104 interconnecting the two chambers. A single bi-directional drive motor 105 which can change its rotational direction by, for example, switching the current flow direction to the motor, includes a drive shaft 107. A pair of smaller and larger drive pulleys 109 and 111 are coaxially fixed to the drive shaft 107. The smaller drive pulley 109 is drivingly connected via an endless belt 113 to a driven pulley 115, concentrically disposed loosely about a multiple gear unit 117. The multiple gear unit 117 has a smaller circular gear portion 121 and a larger circular gear portion 123, and is mounted for rotation on an idler shaft 125. The larger circular gear portion 123 of the multiple gear unit 117 is arranged to continually engage a gear wheel 127 having an integral coaxial rotation hub 129 which projects from the bottom of the cassette-receiving chamber 101 to engage the two keying ribs 31 and 33 formed with the spool core 23 of the film cassette 1. The smaller circular gear portion 121 of the multiple gear unit 117 is intended to be drivingly engaged by either one of a pair of separate pawl ends 131 and 133 of a bi-directional drive member 135. The drive member 135 is mounted atop the driven pulley 115 via a pivot pin 137, disposed parallel to the idler shaft 125. When the multiple gear unit 117 is rotated in a counter-clockwise direction 139 about the idler shaft 125 as viewed in FIG. 8, a thin leaf spring 141 fixed to the drive member 135 at the pivot pin 137 will drag along a plate-like section 143 of the camera body 95 to swing the drive member about the pivot pin until its pawl end 133 drivingly engages the smaller circular gear portion 121 of the multiple gear unit. See FIGS. 7 and 8. Conversely, when the multiple gear unit 117 is rotated in a clockwise direction 145 about the idler shaft 125 as viewed in FIG. 10, the leaf spring 141 will drag along the plate-like section 143 to swing the drive member 135 about the pivot pin 137 until its pawl end 131 drivingly engages the smaller circular gear portion 121 of the multiple gear unit. Thus, energization of the drive motor 105 with a current flow direction to rotate the smaller drive pulley 109 in a counter-clockwise direction 139' as viewed in FIG. 8, will swing the drive member 135 to position its pawl end 133 in driving engagement with the smaller circular gear portion 121 to in turn rotate the larger circular gear portion 123 in the counter-clockwise direction 139, and thereby will rotate the gear wheel 127 in a clockwise direction 147 to in turn rotate the spool core 23 of the film cassette 1 in the unwinding direction U to thrust the non-protruding film leader 43 from the film cassette (as described in detail above) into the film guide channel 104. Energization of the drive motor 105 with a current flow direction to rotate the smaller drive pulley 109 in a clockwise direction 145' as viewed in FIG. 10, will swing the drive member 135 to position its pawl end 131 in driving engagement with the smaller circular gear portion 121 to in turn rotate the larger circular gear portion 123 in the clockwise direction 145, and thereby will rotate the gear wheel 127 in a counter-clockwise direction 151 to in turn rotate the spool core 23 of the film cassette 1 in the rewinding direction opposite to the unwinding direction U to return the film leader 43 to the film cassette.

The larger drive pulley 111 is drivingly connected via an endless belt 153 to a driven pulley 155 which, with an integral circular gear portion 157, is mounted for rotation on an idler shaft 159. A gear wheel 161 is concentrically disposed loosely about the idler shaft 159, and is normally coupled to the pulley gear portion 157 by a pawl member 163 for concurrent rotation with the driven pulley 155 in the counter-clockwise direction 139" as viewed in FIG. 8. The pawl member 163 is mounted atop the gear wheel 161 via a pivot pin 165, disposed parallel to the idler shaft 159, and is urged by a torque spring 167 to releasably engage the pulley gear portion 157. The gear wheel 161 continually engages a gear wheel 169 which is coaxially fixed to a rotatably mounted conventional take-up drum 171 or spool in the take-up chamber 103. Film engagement means, not shown, located on the take-up drum 171, and a spring-urged pressure roller 173 serve to facilitate securing of the film leader 43 to the drum. When the drive motor 105 is energized with a current flow direction to rotate the larger drive pulley 111 in the counter-clockwise direction 139' as viewed in FIG. 8, the pulley gear portion 157 will be rotated in the counter-clockwise direction 139" to orbit the pawl member 163 in the same direction to in turn similarly rotate the gear wheel 161, and thereby rotate the gear wheel 169 in a clockwise direction 147' to similarly rotate the take-up drum 171. Due to the gear and pulley ratios, the pulley gear portion 157 will be rotated at a sufficient speed which ensures that the take-up drum 171 will take-up the film leader 43 faster than the spool core 23 of the film cassette 1 can be rotated to thrust the film leader from the film cassette. As a result, the film pull or tension exerted at the spool core 23 because of take up of the film leader 43 at the take-up drum 171 will cause the smaller circular gear portion 121 of the multiple gear unit 117 to be overdriven in the counter-clockwise direction 139, whereupon the smaller circular gear portion will disengage from the pawl end 133 of the bi-directional drive member 135 as shown in FIG. 9 to, in effect, uncouple the drive motor 105 from the spool core 23. When the drive motor 105 is energized with a current flow direction to rotate the larger drive pulley 111 in the clockwise direction 145' as viewed in FIG. 10, the pulley gear portion 157 will be rotated in the clockwise direction 145". However, the pulley gear portion 157 will not orbit the pawl member 163 as in the previous instance, because of the inclination of the gear teeth. See FIG. 10. As a result, the pawl member 163 cannot serve to rotate the gear wheel 161, and the take-up drum 11 will only be rotated in a counter-clockwise direction 151' because of the film pull exerted at the drum as the filmstrip is rewound onto the spool core 23 of the film cassette 1.

Figure 8:
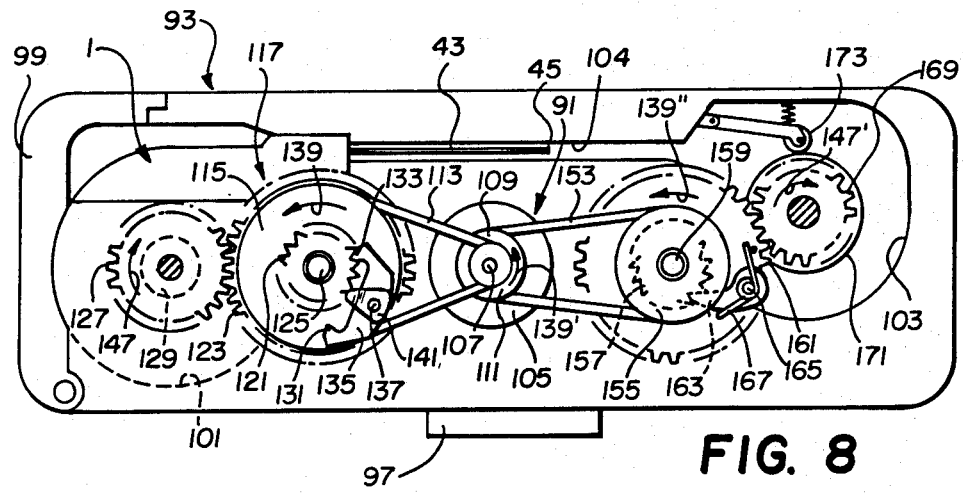
FIGS. 8 and 9 are bottom plan views of the film transport apparatus, showing operation of the bi-directional film drive mechanism in respective modes for rotating the film spool of the film cassette in an unwinding direction and for allowing the spool to be film-driven when the film leader is secured to a take-up drum.
Figure 9:
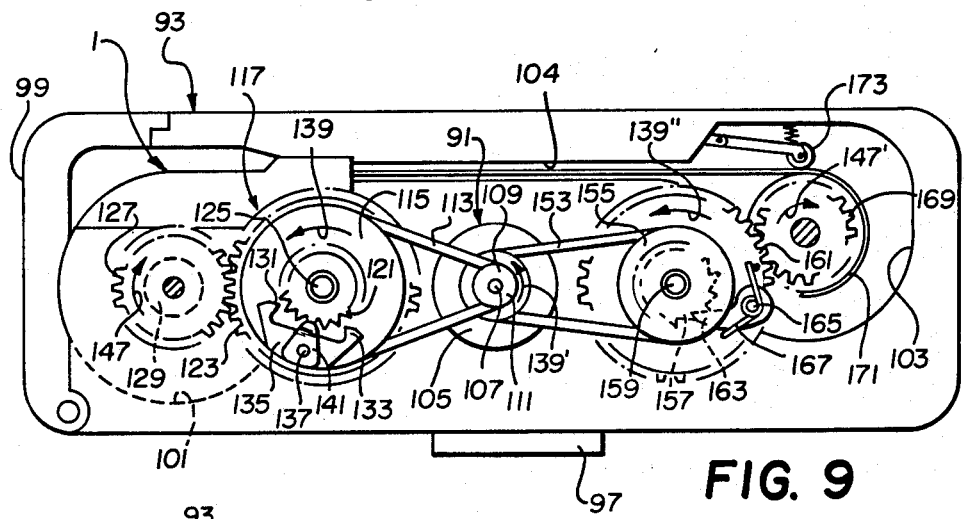
Figure 10:
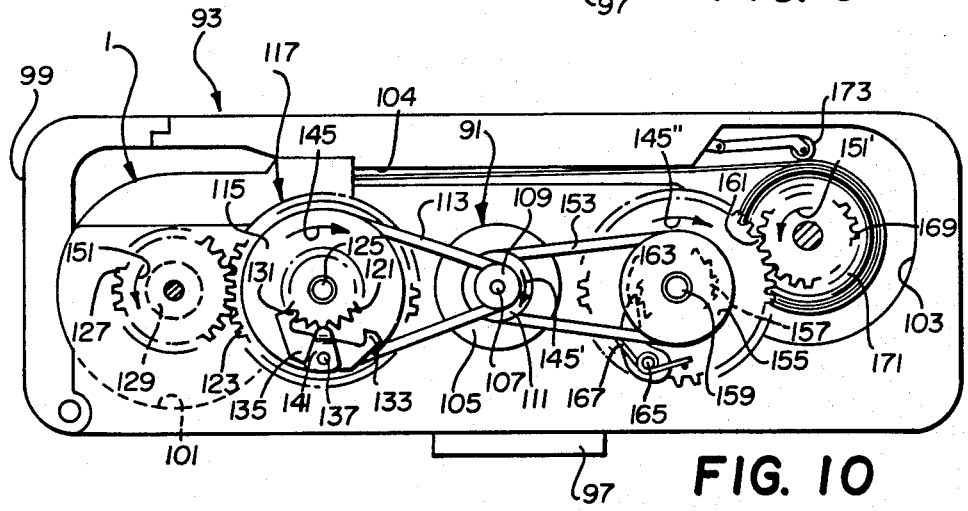
FIG. 10 is a bottom plan view of the film transport apparatus, showing operation of the bi-directional film drive mechanism in a mode for rotating the film spool in a rewinding direction.

It will now be appreciated that the bi-directional drive member 135 has respective positions, shown in FIGS. 8 and 10, for effecting alternate one-way driving connections with the spool core 23 to rotate the spool core in the unwinding and rewinding directions in accordance with the rotational direction of the drive motor 105. During advance of the film leader 43 from the film cassette 1 to the take-up drum 171, the drum is motor-driven at a faster speed than the spool core 23 is rotated. When the film leader 43 is secured to the take-up drum 173, the drive member 135 permits the spool core to be overdriven by the resulting pull of the filmstrip exerted at the spool core. During rewinding of the filmstrip onto the spool core 23, the take-up drum 173 is uncoupled from the drive motor 105 to allow the spool core to serve as the only means for film movement.

The invention has been described with reference to a preferred embodiment. However, it will be appreciated that variations and modifications can be effected with the ordinary skill in the art without departing from the scope of the invention. For example, the leading end 45 of the film leader 43, instead of initially being located as shown in FIG. 3, could be located in the film passage slit 25 of the film cassette 1 or could slightly protrude from the cassette. Thus, the term "non-protruding" as it refers to the film leader 43 in this application is meant to include "essentially non-protruding".

I claim:

1. An improved motor-driven film transport apparatus for a photographic camera to be used with a film cassette having a film spool rotatable to unwind a filmstrip off the spool to propel the filmstrip from the cassette and alternatively to rewind the filmstrip onto the spool to draw the filmstrip back into the cassette, wherein a take-up drum is rotatable to take-up the filmstrip and a bi-directional drive motor is rotatable in a first direction to rotate said take-up drum to take up the filmstrip, and wherein the improvement comprises:

motor-to-drum transmission means for coupling said drive motor and said take-up drum, when the motor is rotated in the first direction, to rotate the drum to take up the filmstrip, and for uncoupling the motor and the drum, when the motor is rotated in an opposite direction, to allow the drum to be rotated freely; and motor-to-spool transmission means for coupling said drive motor and the film spool, when the motor is rotated in the first direction, to rotate the spool to propel the filmstrip from the cassette at a lesser speed than said take-up drum can take up the filmstrip, for uncoupling the motor and the spool in response to a film pull being exerted at the spool due to take up of the filmstrip at the drum, and for coupling the motor and the spool, when the motor is rotated in the opposite direction, to rotate the spool to draw the filmstrip back into the cassette.

2. The improvement as recited in claim 1, wherein said motor-to-spool transmission means includes a bi-directional drive member having respective positions for effecting alternate one-way driving relations with the film spool to rotate the spool to unwind and rewind the filmstrip and being adapted to allow the spool to be overdriven by the film pull exerted at the spool due to take-up of the filmstrip at said take-up drum.

3. The improvement as recited in claim 2, wherein said motor-to-spool transmission means includes change-over means for moving said bi-directional drive member from one of its positions to the other position automatically in accordance with the rotational direction of said drive motor.

4. The improvement as recited in claim 3, wherein said motor-to-drum transmission means includes a uni-directional drive member for effecting a single one-way driving relation with said take-up drum in response to rotation of said drive motor in the first direction and being adapted to allow the drum to rotate freely in response to rotation of the motor in the opposite direction.

5. The improvement as recited in claim 1, wherein said motor-to-spool transmission means includes a bi-directional drive member pivotally mounted for movement in opposite directions to respective positions for effecting alternate one-way driving relations with the film spool to rotate the spool to unwind and rewind the filmstrip, and change-over means for moving said drive member in the opposite directions to its respective positions automatically in accordance with the rotational direction of said drive means.

6. The improvement as recited in claim 1, wherein said motor-to-spool transmission means includes an annular member adapted to be rotated in opposite directions by said drive motor in concentric relation with a gear member for rotating the film spool to unwind and rewind the filmstrip, a bi-directional drive member pivotally mounted on said annular member for movement to respective positions in which the drive member engages said gear member to transmit torque to the gear member in accordance with the rotational direction of the annular member, and change-over means for moving said drive member to its respective positions in response to rotation of said annular member in the opposite directions.

7. The improvement as recited in claim 5, wherein said bi-directional drive member is adapted to allow said gear member to be overdriven by the film pull exerted at the film spool due to take up of the filmstrip at said take-up drum.

8. An improved motor-driven film transport apparatus for a photographic camera to be used with a film cassette having a film spool rotatable to unwind a filmstrip off the spool to propel the filmstrip from the cassette and alternatively to rewind the filmstrip onto the spool to draw the filmstrip back into the cassette, wherein a bi-directional drive motor is rotatable in opposite directions to effect film transport, and wherein the improvement comprises:

a bi-directional drive member having respective positions for effecting alternate one-way driving relations with the film spool to rotate the spool to unwind and rewind the filmstrip; and change-over means for moving said drive member from one of its positions to the other position automatically in accordance with the rotational direction of said drive motor.

* * * * *